United States Patent [19]

Leonard

[11] Patent Number: 4,955,660
[45] Date of Patent: Sep. 11, 1990

[54] TEST STRUCTURE FOR PICKUP TRUCK

[76] Inventor: Viola A. Leonard, 301 W. Hancock, O'Neill, Nebr. 68763

[21] Appl. No.: 408,694

[22] Filed: Sep. 18, 1989

[51] Int. Cl.$^5$ .............................................. B60P 7/04
[52] U.S. Cl. ..................................... 296/165; 296/100; 296/173; 135/88
[58] Field of Search ................ 296/26, 173, 100, 165; 135/88

[56] References Cited

U.S. PATENT DOCUMENTS

| | | | |
|---|---|---|---|
| 3,201,171 | 8/1965 | Wickard . | |
| 3,367,347 | 2/1968 | Smith | 296/26 X |
| 3,447,830 | 6/1969 | Willison | 296/100 X |
| 4,332,265 | 6/1982 | Baker | 296/26 X |
| 4,603,901 | 8/1986 | McIntosh et al. | 296/26 X |
| 4,639,034 | 1/1987 | Amos . | |
| 4,779,916 | 10/1988 | Christie | 296/26 X |
| 4,813,734 | 3/1989 | Hoover | 296/100 |
| 4,815,786 | 3/1989 | McRay | 296/26 X |
| 4,848,828 | 7/1989 | Hunt | 296/100 |

*Primary Examiner*—Margaret A. Focarino
*Assistant Examiner*—Gary C. Hoge

[57] ABSTRACT

A tent-like enclosure installable on the cargo box of a pickup truck to protect cargo or humans within the box. The enclosure is supported on the box by means of a frame structure that includes two inverted U-shaped frame elements having downwardly-extending legs slidably positioned within guide sleeves that are mounted within pre-existing stake pockets (sockets) in the cargo box side walls.

2 Claims, 2 Drawing Sheets

TEST STRUCTURE FOR PICKUP TRUCK

BACKGROUND AND SUMMARY OF THE INVENTION

This invention relates to a flexible tent structure installable on the cargo box of a pickup truck to provide a temporary covering for cargo carried within the box. The tent structure may also be used to adapt the cargo box for use as an overnight sleeping space, e.g. during camping or when travelling long distances. In some respects the tent structure resembles the tent structures shown in U.S. Pat. No. 3,201,171 to H. Wichard and U.S. Pat. No. 4,639,034 to J. Amos.

The presently proposed tent structure includes a frame structure attachable to the cargo box of a pickup truck, and a flexible cover arranged to fit over the frame structure. The frame structure comprises two inverted U-shaped frame elements having downwardly extending legs slidably arranged in vertical sleeves disposed within pre-existing stake-reception sockets at opposite ends of the cargo box side walls.

These U-shaped frame elements can be raised from the cargo box side walls or lowered onto the cargo box side walls. When the frame elements are in their raised positions the flexible cover can be draped over the so-defined frame structure to act as a protective enclosure for persons or cargo within the box.

The invention seeks to provide a cargo box tent structure that is relatively easy to install or remove from the box, and that is comparatively inexpensive to make and/or purchase

THE DRAWINGS

FIG. 3 is taken on a reduced scale, compared to FIG. 2.

DESCRIPTION OF A PREFERRED EMBODIMENT OF THE INVENTION

Figure 2:
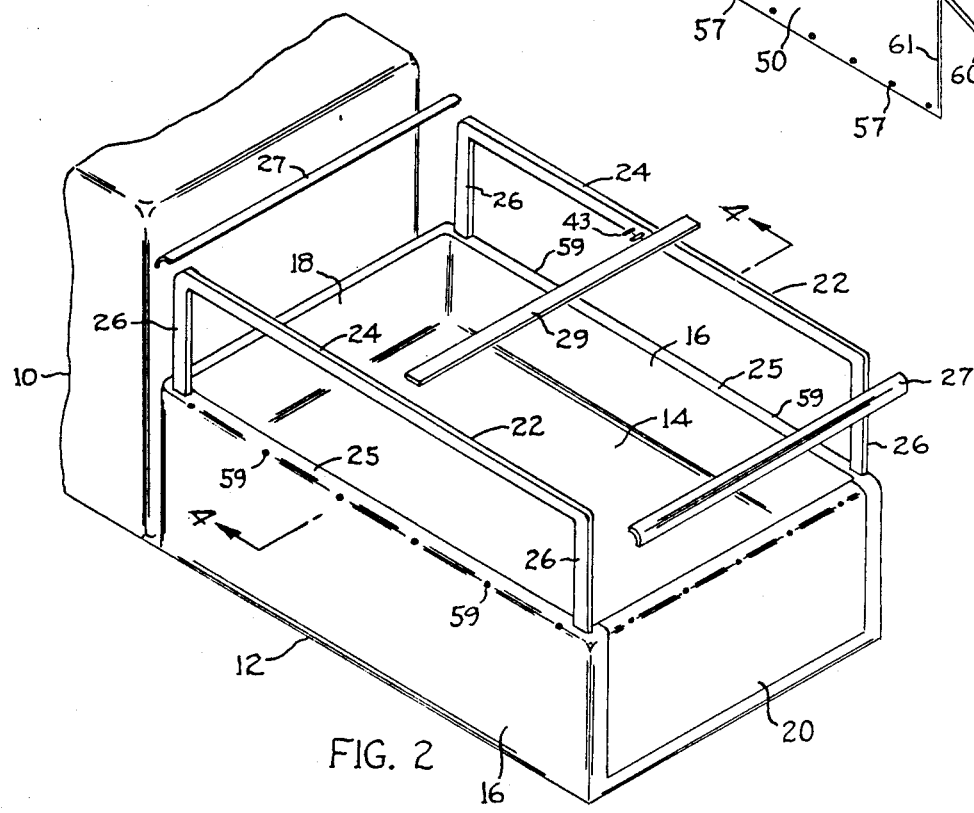
FIG. 2 is a fragmentary perspective view of a pickup truck having the FIG. 1 frame structure installed thereon.

FIG. 2 fragmentarily shows a Conventional pickup truck that includes a cab 10 and cargo box 12. Box 12 comprises a bottom 14, two side walls 16, a front wall 18, and a tailgate 20. The tailgate is adapted to swing down around its lower edge to facilitate placement (or removal) of cargo in (from) the box.

My invention relates to a flexible tent structure adapted to be installed on cargo box 12 to provide a temporary covering for cargo or humans within the box. The tent structure comprises a rigid frame structure shown in FIG. 2, and a flexible cover (canvas, woven plastic, etc.) shown on a reduced scale in FIG. 3. The flexible cover is adapted to be draped over the FIG. 2 frame structure to provide a tent-like enclosure.

As shown in FIG. 2, the frame structure comprises two similarly constructed frame elements 22 of U-shaped configuration. Each frame element includes a horizontal rail 24 and downwardly extending legs 26 at its opposite ends. The legs are adapted for slidable positionment (and adjustment) in guide sleeves, not visible in FIG. 2. Each guide sleeve is installed into a pre-existing stake socket (pocket) formed near an end of the cargo box side wall 16.

Figure 1:
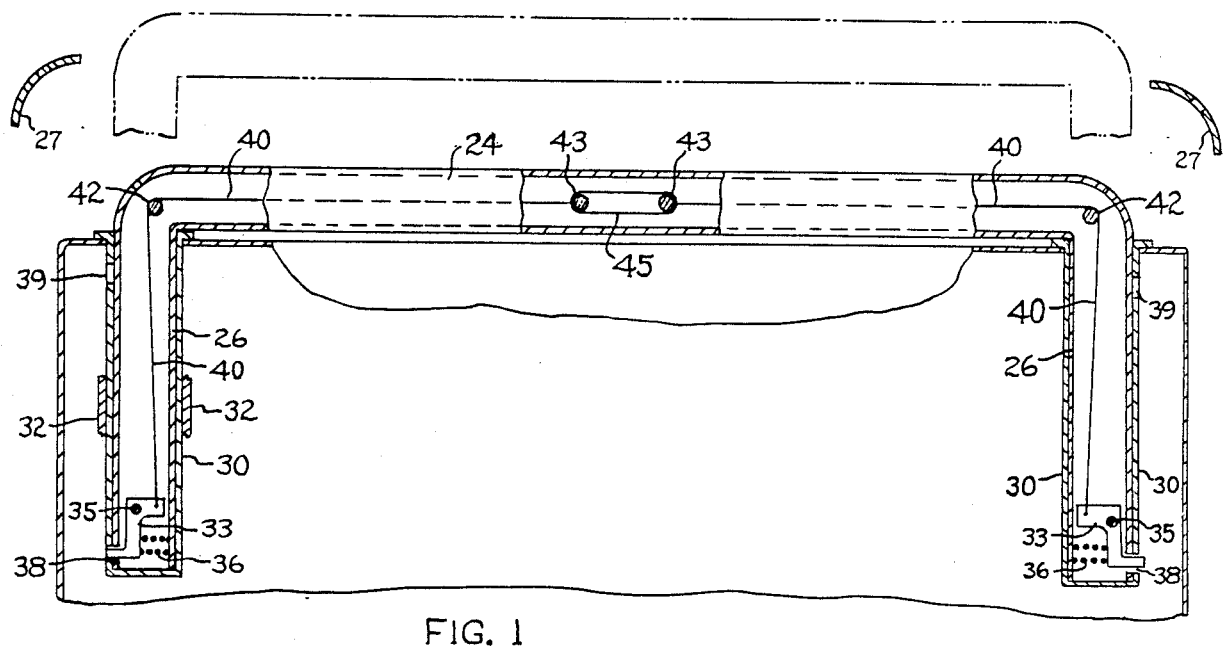
FIG. 1 is a sectional view taken through a retractable frame structure constructed according to the invention.

FIG. 2 shows the two U-shaped framed elements 22 in raised positions wherein rails 24 are spaced above the associated upper edges 25 of box walls 16. The frame elements can be lowered to so-called "retracted" positions wherein rails 24 are in close adjacency to upper edges 25 of the box side walls (as shown in FIG. 4); FIG. 1 shows one frame element 22 in its retracted (lowered) position. When frame elements 22 are in their lowered positions the truck can be used in its normal operating mode (with cargo box covered or uncovered). FIG. 4 shows the flexible cover extending across the otherwise open upper end of the cargo box to protect the box contents from the weather elements. When frame elements 22 are in their raised positions (FIG. 2) the FIG. 3 cover can be installed thereon to form a raised tent enclosure.

The frame structure additionally includes two detachable transverse bars 27 adapted to interconnect frame elements 22 at their front and rear ends; screws, or push-in type fasteners can be used to attach the ends of bars 27 to frame elements 22. Bars 27 will be attached to frame elements 22 prior to installation of the flexible cover on the frame structure. As an option, a third transverse bar 29 can be attached to frame elements 22 at intermediate points along rails 24.

FIG. 1 illustrates a mechanism for mounting a U-shaped frame element 22 on the cargo box side wall 16. Sleeves 30 are inserted into the stake sockets in wall 16 to form stationary guides for legs 26 of frame element 22. A portion of one of the stake sockets is shown at 32 in FIG. 1. Each sleeve 30 will have a close fit in the stake socket, so that the sleeve will not wobble or shift in the socket. Screws (not shown) may be extended through a flange at the upper end of sleeve 30 as added insurance of a satisfactory fit of the sleeve in the socket.

Hollow legs 26 of frame element 22 have close sliding fits in sleeves 30, whereby frame element 22 can be manually raised or lowered to assume either a raised position (FIG. 2) or a lowered position (FIG. 1). Each hollow leg 26 has a latch element 33 swingably mounted therein on a transverse pin 35. The lower end of each latch element extends through an opening in the side wall of leg 26. A compression spring 36 normally biases the associated latch element outwardly so that its lower end can selectively engage in keeper openings 38 and 39 formed, respectively, in the lower and upper ends of associate sleeve 30.

A cable 40 extends upwardly from each latch element 33, around a guide pin 42, and horizontally along (within) rail 24 to an anchorage on a transverse pin 43. The two pins 43 extend outwardly through slots 45 in the walls of rail 24 to form manual actuator devices for latch elements 33. By manually moving the two pins 43 together it is possible to simultaneously retract both latch elements 33 out of the associated keeper openings 38 or 39. When the manual pressure on pins 43 is released the springs 37 bias the associated latch elements 33 toward their FIG. 1 positions. The latch system will releasably retain the associated frame element 22 in its raised or lowered position.

Figure 3:
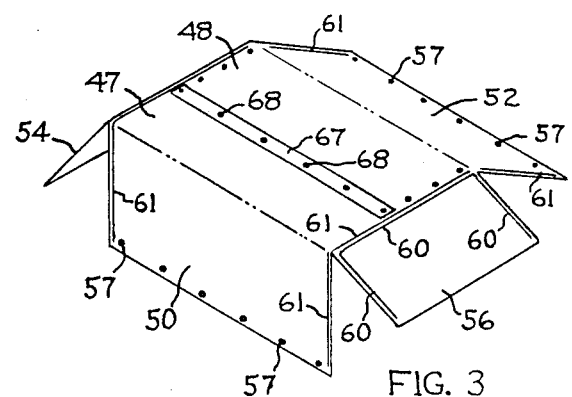
FIG. 3 is a perspective view of a flexible cover usable with the frame structure shown in FIG. 2.
Figure 4:
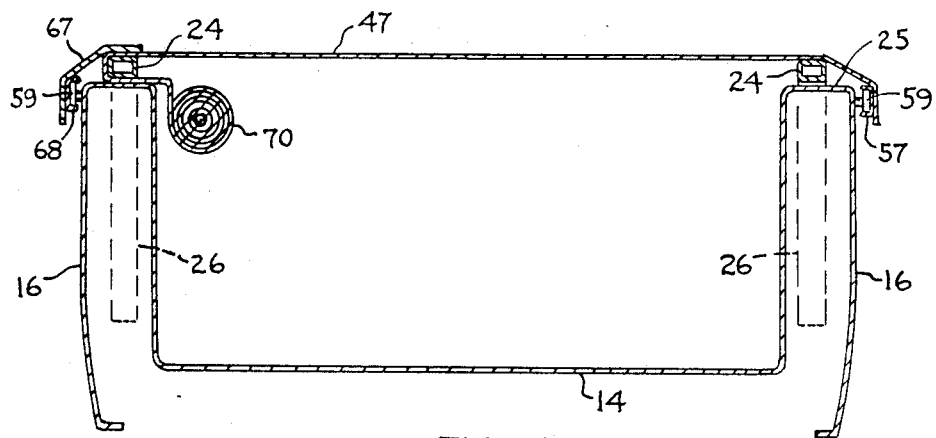
FIG. 4 is a sectional view on line 4—4 in FIG. 2 but taken with the frame structure in a retracted position.

Referring for the moment to FIG. 3, there is shown a flexible cover 47 that includes a rectangular top panel 48 and four rectangular side panels 50, 52, 54 and 56 adapted to extend downwardly from edge areas of panel 48 to form a tent enclosure The dashed lines in FIG. 3 designate demarcation lines between the various panels.

Cover 47 will be installed on the FIG. 2 frame structure so that the panel 48 spans the "top" space circumscribed by rails 22 and bars 27; panels 50 and 52 will extend vertically downwardly so that their lower edges meet the upper edges 25 of the cargo box side walls 12. Panels 54 and 56 will extend vertically downwardly so that their lower edges meet the upper edges of box front wall 18 and tailgate 20. Panels 54 and 56 are preferably formed, at least partly, of flexible non-light transmitting screen material for ventilation purposes when the cover is to be used as a tent structure.

The flexible cover may be secured in place by female snap fasteners 57 attached to lower edges of panels 50, 52, 54 and 56. Cooperating male snap fasteners 59 will be mounted at spaced points along the upper edges of the cargo box. The fasteners will be snapped together after the flexible cover has been draped over the rigid framework. Other fastener systems can be used. e.g. interlocking miniature hook-loop fabric strips sold under the name VELCRO.

Panels 54 and 56 are detachably connected to edge areas of panels 48, 50 and 52. Thus, rear panel 56 has a zipper mechanism 60 running along its top edge and each side edge; the rear edges of panels 48, 50 and 52 have a mating (interlocking) fastener mechanism 61 running along their rear edges. Similar cooperating zipper mechanisms 60 and 61 are provided along the edges of front panel 54 and the associated edge areas of panels 48, 50 and 52.

Panels 54 and 56 will be completely separated from the remaining panels 48, 50 and 52 when the cover is to be used as a cargo box cover, as shown in FIG. 4. When the cover is to be used as a tent enclosure (with the frames structure raised) panels 54 and 56 will be reattached to the other panels (via zippers 60 and 61).

When the cover is to be used as a tent enclosure the vertical corners formed by panels 50, 52, 54 and 56 will be closed by zipper fasteners 60 and 61.

An auxiliary flap structure 67 is stitched to the upper face of panel 48 in a location between the panel side edges. Female snap fasteners 68 are mounted at space points along the length of flap structure 67. Flap structure 67 comes into play when the flexible cover structure is to be used as a cargo box cover, as shown in FIG. 4. Snap fasteners 68 on flap structure 67 snap over the male snap fasteners 59 on the left side wall 16 of the cargo box. A portion of panel 48 is turned reversely back into the cargo box underneath the left rail 24. The remaining (excess) cover material may then be rolled into a compact package, as shown at 70 in FIG. 4; panels 54 and 56 can be stored within the rolled material. Snap fastener elements can be mounted on the upper edge of tailgate 20 and the rear edges of cover structure 47; similar snap fasteners can be provided along the front edges of the cover structure, so that when the cover structure is acting as a cover for the cargo box (FIG. 4) the entire peripheral edge area of the cover structure will be fastened to the vehicle.

I claim:

1. In combination with a pickup truck that includes a cargo box defined by two upstanding side walls, a front wall, and a tailgate, each side wall having stake reception sockets therein near the front and rear ends thereof; the tailgate and each said wall having an upper edge:

the improvement comprising flexible tent means installable on the cargo box to provide a temporary cover; said tent means including a retractable frame structure supported on the box side walls, and a flexible cover arranged to fit over said frame structure when said structure is pulled upwardly from a retracted position;

said frame structure comprising a sleeve insertable into each stake socket to form a vertical guide, two similarly constructed side frame elements, and two detachable transverse bars adapted to interconnect said frame elements at their front and rear ends;

each side frame element being a U-shaped member that includes a horizontal rail and downwardly-extending legs at each end of said rail;

each U-shaped member having its downwardly extending legs slidably positioned in two of the guide sleeves at the front and rear ends of a box side wall, whereby each respective horizontal rail will have a retracted position extending along the upper edge of the cargo box side wall and a raised position spaced above the upper edge of the box side wall; said transverse bars being attachable to the frame elements so as to span the zones above the box front wall and tailgate, respectively, when the side frame elements are in their raised positions;

said flexible cover comprising a central rectangular top panel having four edges and a rectangular side panel (50, 52, 54, 56) hingedly connected to each edge of said central panel being adapted to assume a centralized position over the frame structure, with the four side panels hanging downwardly along the frame structure when the frame structure is in its raised position;

and a manually-actuable latch means located within each side frame element for releasably retaining each said frame element in its raised position; each said latch means comprising a movable latch element mounted in each leg of the associated frame element, and a manual actuator mounted in the associated horizontal rail; each said actuator being operably connected to both associated latch elements, whereby a manual operating force on a given actuator operates both associated latch elements.

2. In combination with a pickup truck that includes a cargo box defined by two upstanding side walls, a front wall, and a tailgate, each side wall having stake reception sockets therein near the front and rear ends thereof; the tailgate and each said wall having an upper edge:

the improvement comprising flexible tent means installable on the cargo box to provide a temporary cover; said tent means including a retractable frame structure supported on the box side walls, and a flexible cover arranged to fit over said frame structure when said structure is pulled upwardly from a retracted position to a raised position;

said frame structure comprising a sleeve insertable into each stake socket to form a vertical guide, two similarly constructed side frame elements, and two detachable transverse bars adapted to interconnect said frame elements at their front and rear ends;

each side frame element being a U-shaped member that includes a horizontal rail and downwardly-extending legs at each end of said rail;

each U-shaped member having its downwardly extending legs slidably positioned in two of the guide sleeves at the front and rear ends of a box side wall, whereby each respective horizontal rail will have a retracted position extending along the upper edge of the cargo box side wall and a raised position spaced above the upper edge of the box side wall; said transverse bars being attachable to the frame elements so as to span the zones above the box front wall and tailgate, respectively, when the side frame elements are in their raised positions;

said flexible cover comprising a central rectangular top panel having four edges, and a rectangular side panel hingedly connected to each edge of said central panel; each side panel having a lower edge; said central panel being adapted to assume a centralized horizontal position over the frame structure, with the four side panels hanging downwardly along the frame structure when the frame structure is in its raised position;

said rectangular side panels including two side panels having lower edges thereof adapted to extend along the upper edges of the cargo box side walls, and two other panels having lower edges thereof adapted to extend along the upper edges of the cargo box front wall and tailgate, respectively; said two other panels being detachable from the remaining panels;

said flexible cover being adapted to serve as a cover for the cargo box when the frame structure is in a retracted position; said flexible cover having a flap structure (67) attached to the central panel at a point intermediate said two side panels, a first attachment means (68) extending along said flap structure for attachment thereof to an upper edge of one of the cargo box side walls, and a second attachment means (57) extending along the flexible cover parallel to said first attachment means for attachment of the cover to an upper edge of the other cargo box side wall when the frame structure is in a retracted position.

* * * * *